(12) United States Patent
Shin et al.

(10) Patent No.: US 10,000,192 B2
(45) Date of Patent: Jun. 19, 2018

(54) ELECTRO-MECHANICAL BRAKE FOR INCREASING BRAKING FORCE

(71) Applicant: Daegu Gyeongbuk Institute of Science and Technology, Daegu (KR)

(72) Inventors: Dong Hwan Shin, Daegu (KR); Choong Pyo Jeong, Daegu (KR); Kel Seh Lee, Daegu (KR); Seong Hun Lee, Daegu (KR); Sung Ho Jin, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 275 days.

(21) Appl. No.: 15/007,288

(22) Filed: Jan. 27, 2016

(65) Prior Publication Data

US 2016/0377136 A1 Dec. 29, 2016

(30) Foreign Application Priority Data

Jun. 23, 2015 (KR) .......................... 10-2015-0089146

(51) Int. Cl.

| F16D 65/18 | (2006.01) |
|---|---|
| B60T 13/74 | (2006.01) |
| F16D 55/226 | (2006.01) |
| F16D 121/24 | (2012.01) |
| F16D 125/40 | (2012.01) |
| F16D 125/66 | (2012.01) |

(52) U.S. Cl.
CPC .......... *B60T 13/741* (2013.01); *F16D 55/226* (2013.01); *F16D 65/183* (2013.01); *F16D 2121/24* (2013.01); *F16D 2125/40* (2013.01); *F16D 2125/66* (2013.01)

(58) Field of Classification Search
CPC .......... F16D 65/14; F16D 65/16; F16D 65/18; F16D 65/0068; F16D 55/225; F16D 2055/0016

See application file for complete search history.

(56) References Cited

U.S. PATENT DOCUMENTS

| 6,752,247 B2 * | 6/2004 | Hartsock ................. B60T 13/74 188/156 |
| 2010/0140028 A1 * | 6/2010 | Kim ........................ F16D 65/18 188/72.7 |

* cited by examiner

*Primary Examiner* — Vishal R Sahni (74) *Attorney, Agent, or Firm* — Sughrue Mion, PLLC (57) ABSTRACT

An electro-mechanical brake for increasing a braking force is provided. The electro-mechanical brake for increasing the braking force according to an embodiment of the present invention may include the upper pad together with the inner pad and the outer pad, the inner pad may pressurize the inner side surface of the disk by the movement of the moving block by the rotation of the screw, the outer pad may pressurize the outer side surface of the disk, the upper pad may also pressurize the cylindrical surface of the upper end of the disk, and thus the braking force may be increased since the additional braking force can be further generated by pressurizing the cylindrical surface of the upper end of the disk compared with a case of pressurizing the inner side surface and the outer side surface of the disk.

16 Claims, 7 Drawing Sheets

ELECTRO-MECHANICAL BRAKE FOR INCREASING BRAKING FORCE

CROSS-REFERENCE TO RELATED APPLICATION

This application claims priority to and the benefit of Korean Patent Application No. 10-2015-0089146, filed on Jun. 23, 2015, the disclosure of which is incorporated herein by reference in its entirety.

BACKGROUND

1. Field of the Invention

The present invention relates to an electro-mechanical brake, and more particularly, to an electro-mechanical brake for increasing a braking force capable of achieving a stable driving by increasing the braking force.

2. Discussion of Related Art

A brake for decreasing a speed is provided in a vehicle. In this case, a conventional brake is generally operated hydraulically. That is, the conventional brake amplifies a force depressing a pedal by hydraulic booster, converts this amplified force into a fluid-pressure, operates a piston by transferring the converted fluid-pressure to a cylinder, and pressurizes a disk rotating together with a wheel through a pad disposed in the front end of the piston.

The conventional hydraulic brake has a function of decreasing a speed of a vehicle, but there is a problem that the manufacturing and management are inconvenient since it is constructed by a lot of components.

Further, the conventional hydraulic brake has a problem that a braking distance becomes great since a braking response is relatively slow.

For these reasons, an electro-mechanical brake has been proposed recently.

Since the pressurization of the disk through the pad is performed by a driving of a motor, the electro-mechanical brake may have a simple structure and increase the braking response compared with the conventional hydraulic brake.

However, since the conventional electro-mechanical brake pressurizes only an inner surface and an outer surface of the disk through an inner pad and an outer pad, there are problems in which a pressurization force is limited and the braking force and braking torque falls short of expectations In order to solve the problems, a method of increasing a capacity of a motor is being used, but in a large capacity of motor, there are problems such as limitations of installation and a burden of a cost since its size is great and its cost is expensive.

In order to solve the problems, development of an electro-mechanical brake capable of increasing the braking force without increasing the capacity of the motor has been tried, but is in a situation in which a satisfactory result has not yet been obtained.

SUMMARY OF THE INVENTION

The present invention is directed to an electro-mechanical brake for increasing a braking force capable of solving a problem that the braking force falls short of expectations since a conventional electro-mechanical brake has a limitation in a pressurization of a disk through an inner pad and an outer pad.

The above and other objects, features and advantages of the present invention will become more apparent to those of ordinary skill in the art by describing in detail exemplary embodiments thereof with reference to the accompanying drawings.

According to an aspect of the present invention, there is provided an electro-mechanical brake for increasing a braking force, including: a carrier coupled to a vehicle frame, and configured to accompany an upper end portion of a disk rotating together with a wheel of a vehicle, and including a sliding guide formed in both side plates; a column installed to be movable along with the sliding guide, and including a screw rotating according to a driving of a motor inside; a caliper coupled with the carrier, and configured to move by a contact with the column; a moving block to be screwed by the screw, and moving in front and rear directions on the screw according to a rotation of the screw; an inner pad configured to pressurize an inner side surface of the disk by moving to the inner side surface of the disk by the movement of the moving block; an outer pad configured to pressurize an outer side surface of the disk by moving to the outer side surface of the disk by the movement of the moving block; and an upper pad configured to pressurize a cylindrical surface of an upper end of the disk by moving to the upper end of the disk by the movement of the moving block.

The carrier may include a moving member which is movable in a horizontal direction on a bottom surface of a rear end.

The moving member may be arranged in a rail formed in the bottom surface of the rear end of the carrier.

The caliper may include a first groove portion in which inclined surfaces are formed on both sides on an upper surface of an inner side adjacent to the upper pad.

The column may include a second groove portion on which inclined surfaces are formed on both sides on the front end adjacent to the inner pad.

The column may include a contact member moving by the movement of the moving block in a rear end.

The contact member may include a first arm extending to the moving block.

The contact member may include both inner side surfaces formed to be apart from both side surfaces of the moving member included in the carrier, respectively, and both outer side surfaces formed to be apart from both inner side surfaces of the column, respectively.

The inner pad may be arranged in front of the column in a state to be apart from the inner side surface of the disk.

The inner pad may include a first protruding part, on which an inclined surface to contact with an inclined portion of a second groove portion formed in the column, is formed on the rear end.

The inner pad may include a second arm extending to the moving block.

The second arm may be formed in multi-stage.

The outer pad may be arranged in a front end of the carrier in a state to be apart from the outer side surface of the disk.

The upper pad may be arranged in a state to be apart from the cylindrical surface of the upper end of the disk.

The upper pad may include a second protruding part on which an inclined surface to contact with an inclined surface of a first groove portion formed in the caliper, is formed on an upper end.

The second protruding part may be coupled to the moving member included in the carrier through a connection bar.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The above and other objects, features and advantages of the present invention will become more apparent with reference to exemplary embodiments which will be described hereinafter with reference to the accompanying drawings. However, the present invention is not limited to exemplary embodiments which will be described hereinafter, and can be implemented by various different types. Exemplary embodiments of the present invention are described below in sufficient detail to enable those of ordinary skill in the art to embody and practice the present invention. The present invention is defined by claims. Meanwhile, the terminology used herein to describe exemplary embodiments of the invention is not intended to limit the scope of the invention. The articles "a," "an," and "the" are singular in that they have a single referent, but the use of the singular form in the present document should not preclude the presence of more than one referent.

Hereinafter, an electro-mechanical brake for increasing a braking force according to an embodiment of the present invention will be described in detail with reference to the accompanying drawings.

Figure 1:
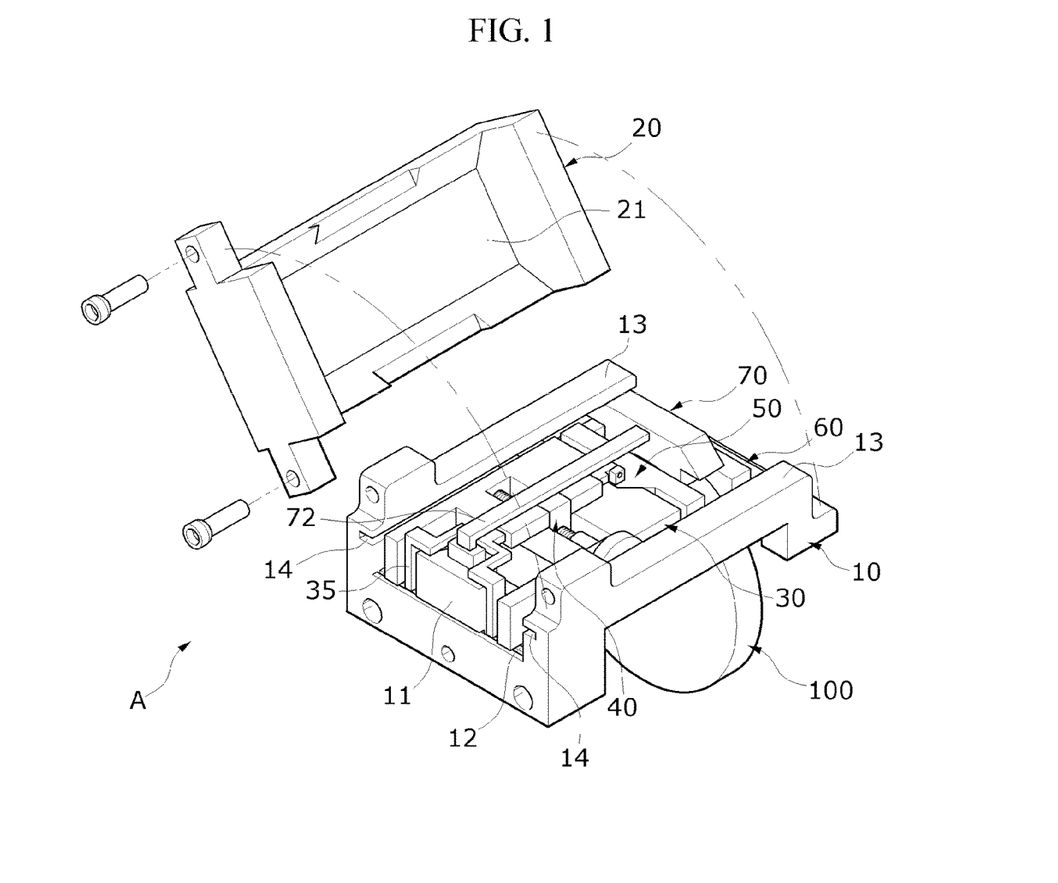
FIG. 1 is an exploded perspective view illustrating a structure of an electro-mechanical brake for increasing a braking force according to an embodiment of the present invention.
Figure 2:
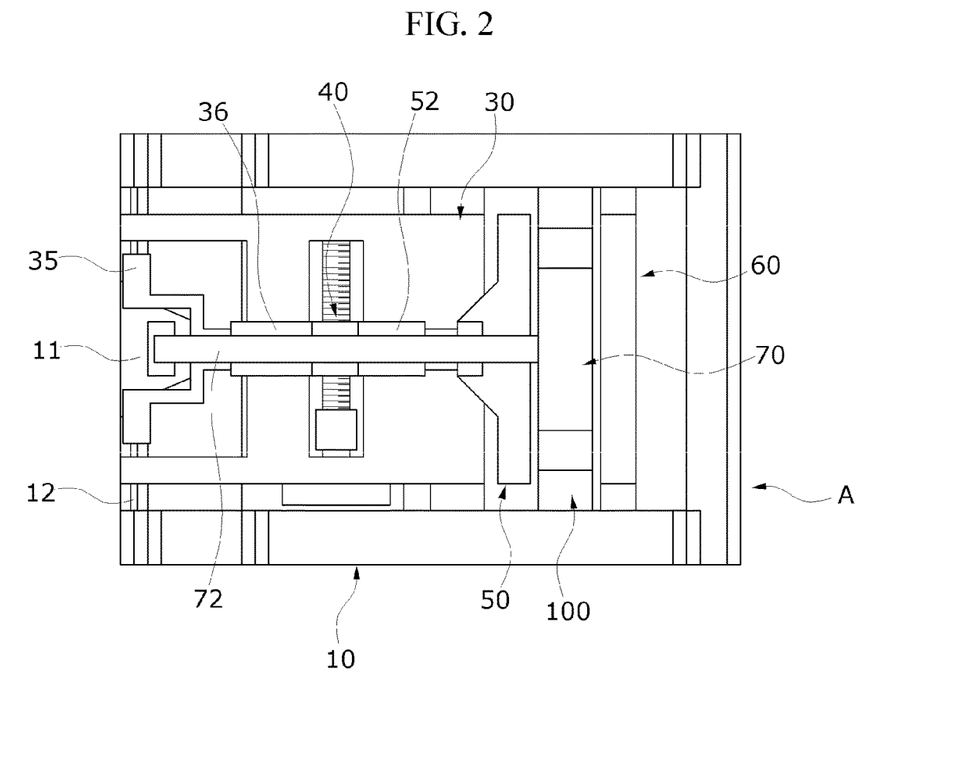
FIG. 2 is a plane view illustrating a main portion of the structure of the electro-mechanical brake according to an embodiment of the present invention.

FIG. 1 is an exploded perspective view illustrating a structure of the electro-mechanical brake for increasing a braking force according to an embodiment of the present invention, and FIG. 2 is a plane view illustrating a main portion of the structure of the electro-mechanical brake according to an embodiment of the present invention.

As shown in FIGS. 1 and 2, an electro-mechanical brake A for increasing a braking force according to an embodiment of the present invention may include a carrier 10, a caliper 20, a column 30, a moving block 40, an inner pad 50, an outer pad 60, and an upper pad 70.

The carrier 10 may be coupled to a vehicle frame (not shown), accommodate an upper end portion of a disk 100 rotating together with a wheel (not shown) of the vehicle, and include a sliding guide 14 formed in both side plates 13.

The carrier 10 may include a moving member 11 which is movable in a horizontal direction in a bottom of a rear end.

Accordingly, the upper pad 70 connected to the moving member 11 may be movable in the horizontal direction as the moving member 11 moves in the horizontal direction. In this case, the moving member 11 may be arranged in a rail 12 formed in the bottom of the rear end of the carrier 10.

Since the moving member 11 is arranged in the rail 12 formed in the bottom of the rear end of the carrier 10, the moving member 11 may be easily moved by the guidance of the rail 12.

The moving member 11 may be moved in a horizontal direction by a contact with a contact member 35 which will be described below.

That is, the moving member 11 is movable in the horizontal direction as any one inner side surface of the contact member 35 is in contact with one outer side surface of the moving member 11.

Meanwhile, the sliding guide 14 may be formed in a groove form extending in a horizontal direction, and the column 30 and the outer pad 60 may be movable by the sliding guide 14 as protruding parts (not shown) located in both sides of the column 30 and protruding parts (not shown) located in both sides of the outer pad 60 are inserted in the sliding guide 14.

The column 30 may be installed to be movable along with the sliding guide 14, and include a screw 32 rotating according to a driving of a motor 33 inside.

The column 30 may include a second groove portion 34 in which inclined surfaces 34a are formed in both sides of a front end adjacent to the inner pad 50, and accordingly, the column 30 is moved to the front direction by a contact with the inclined surface 34a when a first protruding part 51 of the inner pad 50 is moved inside the second groove portion 34, and the column 30 may be in contact with an inner side surface of the disk 100.

The column 30 may include the contact member 35 moving by the movement of the moving block 40 located in the rear end. Accordingly, the moving member 11 may be movable in the horizontal direction according to the contact with the moving member 11 while the contact member 35 is moved. In this case, the contact member 35 may include a first arm 36 extending to the moving block 40.

Since the contact member 35 is coupled to the moving block 40 by including the first arm 36 extending to the moving block 40, the contact member 35 may be movable by the movement of the moving block 40.

Both inner side surfaces of the contact member 35 may be apart from both of the side surfaces of the moving member 11, respectively, and both outer side surfaces of the contact member 35 may be desirable to be apart from both inner side surfaces of the column 30.

According to the structure described above, in an initial movement process of the moving block 40, the moving block 40 may not be moved before any one surface of both of the outer side surfaces of the moving member 35 is in contact with any one surface of both of the inner side surfaces of the column 30 and until any one surface of both of the inner side surfaces of the contact member 35 is in contact with any one surface of both side surfaces of the moving member 11.

Further, the movement of the upper pad 70 by the movement of the moving member 11 may be performed after the initial movement of the moving block 40, that is, after the inner pad 50 is in contact with the inner side surface of the disk 100.

The caliper 20 may be coupled to the carrier 10, and be moved by the contact with the column 30.

Since the caliper 20 includes the first groove portion 21 in which inclined surfaces 21a are formed in both sides on the upper surface of the inner side adjacent to the upper pad 70, the caliper 20 may be in contact with a cylindrical surface of the upper end of the disk 100 toward a lower portion by a contact with the inclined surface 21a in the first groove portion 21 when a second protruding part 71 of the upper pad 70 which will be described below is moved in the horizontal direction.

Meanwhile, the caliper 20 may be coupled to the carrier 10 by a guide pin (not shown).

That is, the guide pin penetrating a through-hole (not shown) formed in the caliper 20 may be coupled to a guide hole (not shown) formed in the carrier 10, and thus the caliper 20 and the carrier 10 may be coupled.

An inner surface of a rear end of the caliper 20 may be adjacent to the rear end of the column 30.

The column 30 may be moved to the rear end since the inner surface of the rear end of the caliper 20 is adjacent to the rear end of the column 30, and the caliper 20 may be movable since the rear end of the column 30 is in contact with the inner surface of the rear end of the caliper 20.

The inner pad 50 may be moved to the inner side surface of the disk 100 by the movement of the moving block 40, and pressurize the inner surface of the disk 100.

Since the inner pad 50 is arranged in front of the column 30 in a state to be apart from the inner side surface of the disk 100, the inner pad 50 and the inner side surface of the disk 100 may be in contact with each other only when the motor 33 is driven and the moving block 40 is moved.

The inner pad 50 may include the first protruding part 51 on a rear end of the inner pad 50 on which an inclined surface 51a is formed to contact the inclined surface 34a of the second groove portion 34 formed in the column 30.

Since the first protruding part 51 on the rear end of the inner pad 50 on which the inclined surface 51a is formed to contact the inclined surface 34a of the second groove portion 34 formed in the column 30 is included, the inner pad 50 may be movable to the inner side surface of the disk 100 since the inclined surface 34a of the second groove portion 34 and an inclined surface 51a of the first protruding part 51 are in contact with each other when the inner pad 50 is moved.

The inner pad 50 may include a second arm 52 extending to the moving block 40.

Since the inner pad 50 includes the second arm 52 extending to the moving block 40, the inner pad 50 and the moving block 40 are coupled by the second arm 52, and the inner pad 50 may be moved according to the movement of the moving block 40. In this case, forming the second arm 52 in multi-stage is preferable.

Since the second arm 52 is formed in the multi-stage and a length of the second arm 52 becomes great as one end is protruded from the other end, the inner pad 50 connected to the moving block 40 may be movable to the inner side surface of the disk 100.

The outer pad 60 may pressurize an outer side surface of the disk 100 by being moved to the outer side surface of the disk 100 by the movement of the moving block 40.

The outer pad 60 may be arranged in a front end of the carrier 10 in a state of being apart from the outer side surface of the disk 100.

Since the outer pad 60 is arranged in the front end of the carrier 10 in a state of being apart from the outer side surface of the disk 100, the outer pad 60 and the outer side surface of the disk 100 may be in contact with each other only when the motor 33 is driven and the moving block 40 is moved.

Meanwhile, the outer pad 60 may pressurize the outer side surface of the disk 100 after the inner pad 50 pressurizes the inner side surface of the disk 100.

That is, when the motor 33 is further driven and the moving block 40 is moved in a state in which the inner pad 50 pressurizes the inner side surface of the disk 100, the carrier 10 may be moved in a direction opposite the disk 100 by a reaction force generated. Accordingly, the outer side surface of the disk 100 may be pressurized toward the outer side surface of the disk 100.

The upper pad 70 may be moved to the upper end of the disk 100 by the movement of the moving block 40, and pressurize the cylindrical surface of the upper end of the disk 100.

The upper pad 70 may be arranged in a state to be apart from the cylindrical surface of the upper end of the disk 100.

Since the upper pad 70 is arranged in the state to be apart from the cylindrical surface of the upper end of the disk 100, the upper pad 70 and the cylindrical surface of the upper end of the disk 100 may be in contact with each other only when the motor 33 is driven and the moving block 40 is moved.

The upper pad 70 may include a second protruding part 71 on an upper end of the upper pad 70 on which an inclined surface 71a is formed to contact the inclined surface 21a of the first groove portion 21 formed in the caliper.

Accordingly, when the upper pad 70 is moved, the upper pad 70 may be movable to the cylindrical surface of the upper end of the disk 100 as the inclined surface 21a of the first groove portion 21 and the inclined surface 71a of the second protruding part 71 are in contact with each other. In this case, since the second protruding part 71 is coupled to the moving member 11 through a connection bar 72, the upper pad 70 including the second protruding part 71 may be movable in the horizontal direction by the horizontal movement of the moving member 11.

Meanwhile, the upper pad 70 may pressurize the cylindrical surface of the upper end of the disk 100 after the inner pad 50 pressurizes the inner side surface of the disk 100.

That is, as the motor 33 is further driven in the state in which the inner pad 50 pressurizes the inner side surface of the disk 100, the moving block 40 may be moved and the upper pad 70 may be also moved.

The contact member 35 may be moved by the movement of the moving block 40, and as the contact member 35 is in contact with the moving member 11, the contact member 35 may pressurize the outer side surface of the disk 100 toward the cylindrical surface of the upper end of the disk 100.

An operation of the electro-mechanical brake A for increasing the braking force according to an embodiment of the present invention will be described in detail below with reference to FIGS. 3 to 7.

Figure 3:
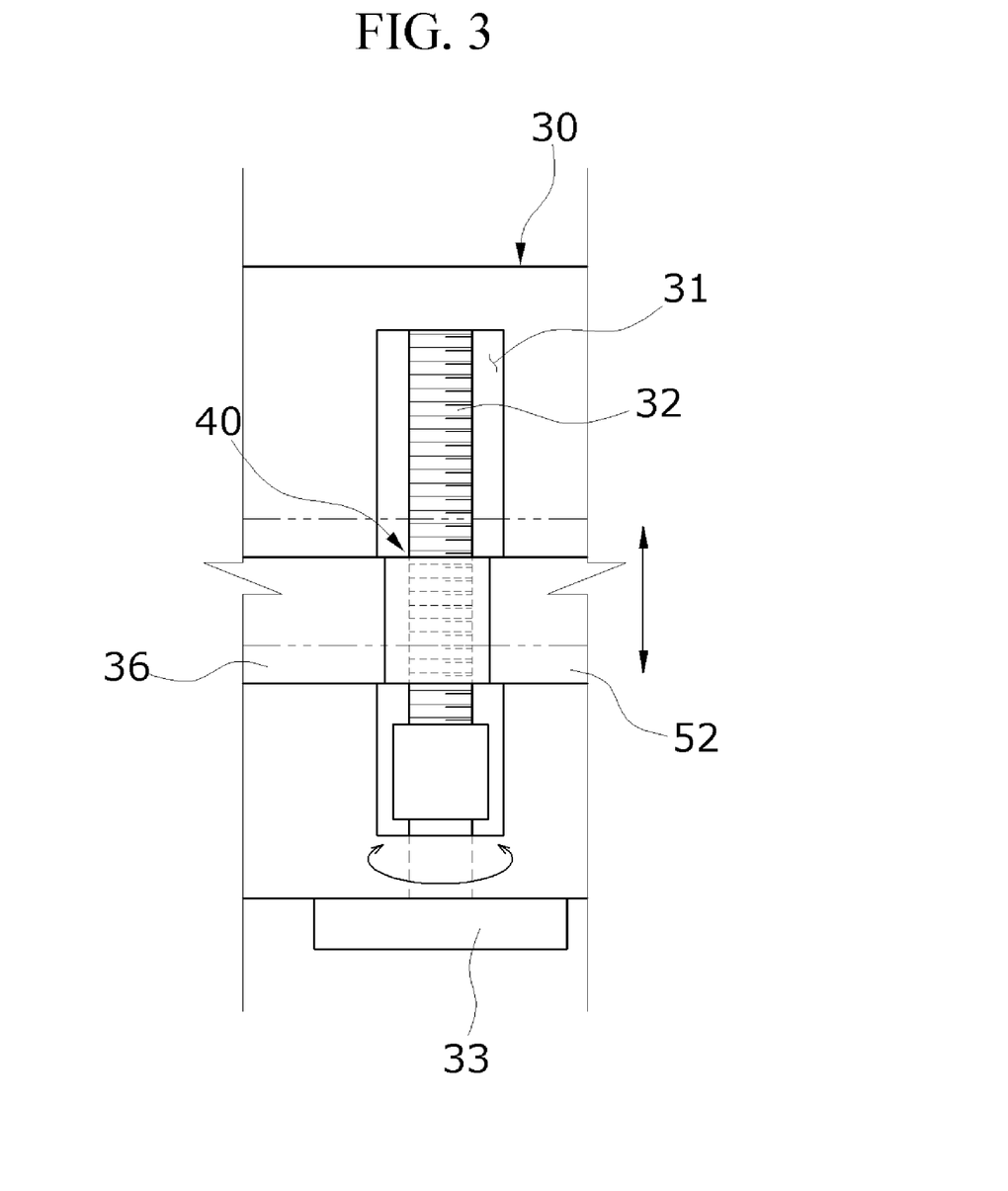
FIG. 3 is a diagram for describing movement of a moving block according to an embodiment of the present invention.
Figure 4:
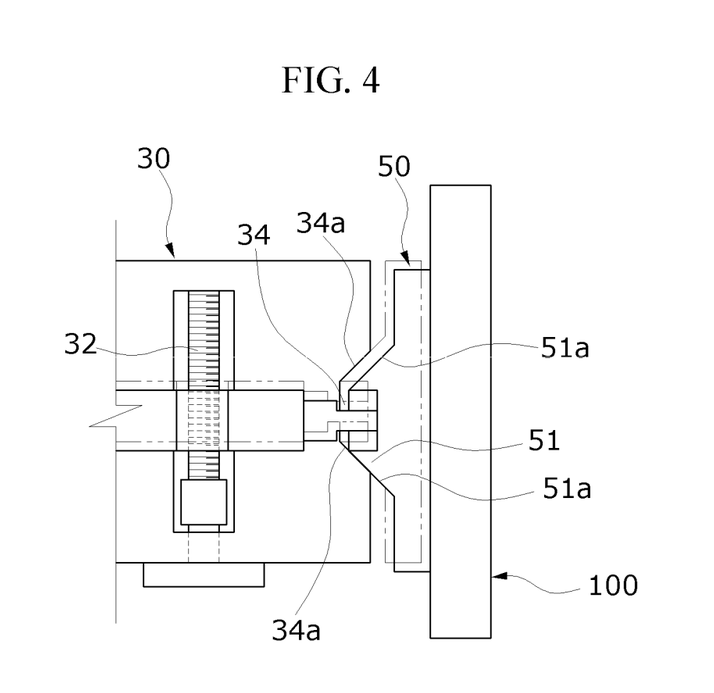
FIG. 4 is a diagram for describing pressurization of an inner surface of a disk by an inner pad according to an embodiment of the present invention.
Figure 5:
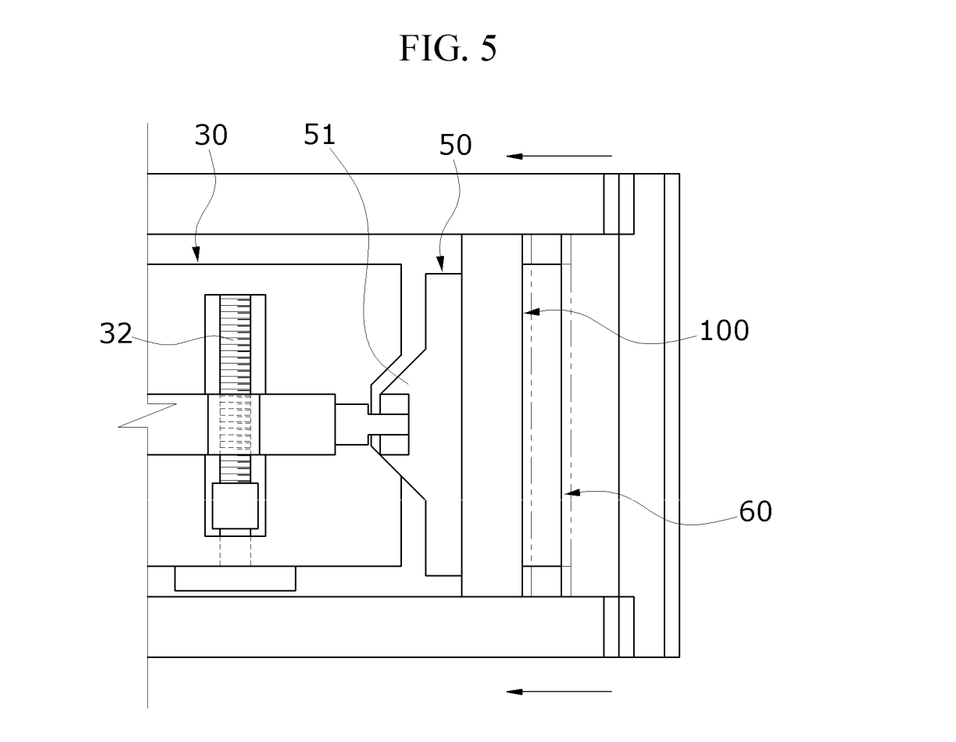
FIG. 5 is a diagram for describing pressurization of an outer surface of the disk by an outer pad according to an embodiment of the present invention.
Figure 6:
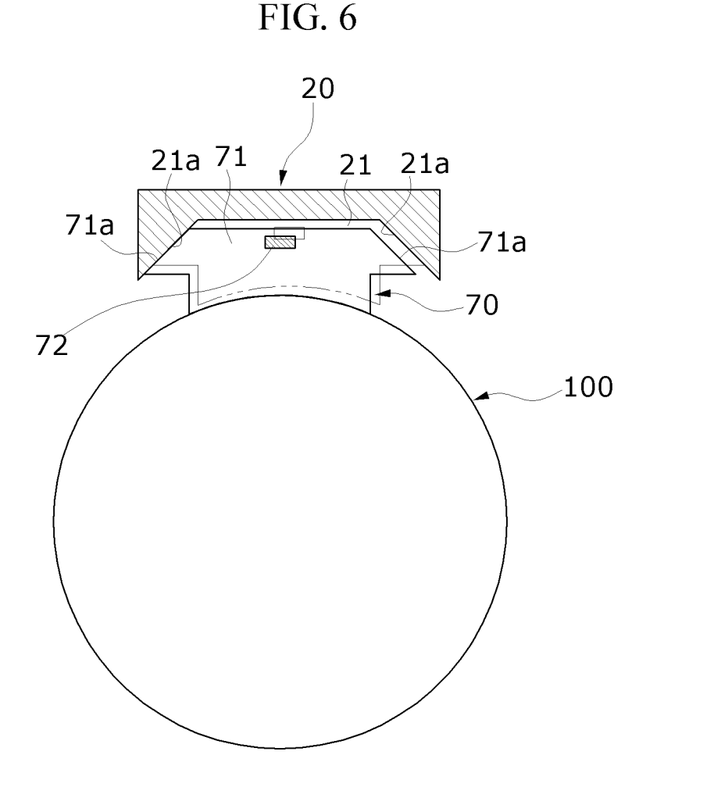
FIG. 6 is a diagram for describing pressurization of a cylindrical surface of an upper end of the disk by an upper pad according to an embodiment of the present invention.
Figure 7:
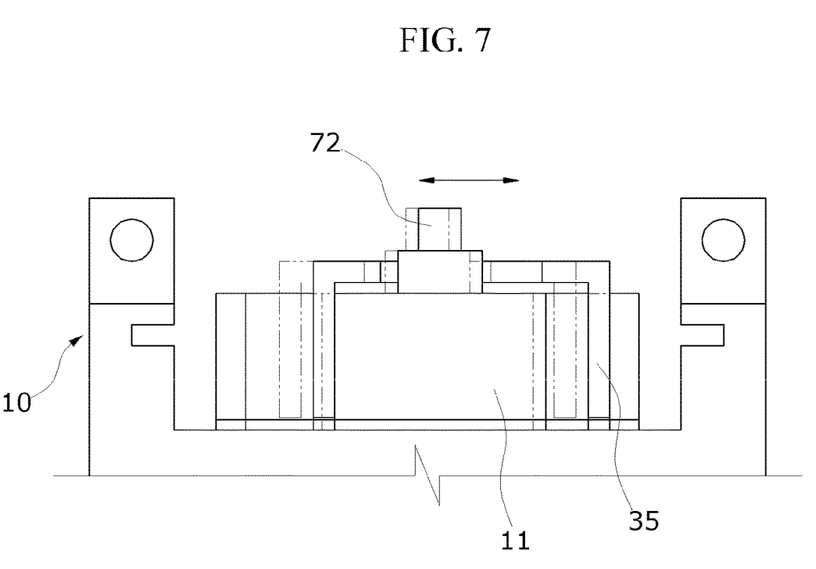
FIG. 7 is a diagram for describing movement of a moving member according to an embodiment of the present invention.

FIG. 3 is a diagram for describing movement of a moving block according to an embodiment of the present invention, FIG. 4 is a diagram for describing pressurization of an inner side surface of a disk by an inner pad according to an embodiment of the present invention, FIG. 5 is a diagram for describing pressurization of an outer side surface of the disk by an outer pad according to an embodiment of the present invention, FIG. 6 is a diagram for describing pressurization of a cylindrical surface of an upper end of the disk by an upper pad according to an embodiment of the present invention, and FIG. 7 is a diagram for describing movement of a moving member according to an embodiment of the present invention.

The motor 33 may be driven by an electric signal generated when a driver presses down a brake pedal (not shown). In this case, the motor 33 may rotate the screw 32 included in an open portion 31 of the column 30, and the screw 32 may be screwed into the moving block 40.

Further, the moving block 40 may be coupled to the inner pad 50 by the second arm 52, and as shown in FIG. 3, the moving block 40 may be moved by the driving of the motor 33, and the inner pad 50 may be moved by the movement of the moving block 40.

Moreover, the inner block 50 may include the first protruding part 51 in which the inclined surface 51a is formed on both sides of the rear end of the inner pad 50, and the inclined surface 51a of the first protruding part 51 may be in contact with the inclined surface 34a of the second groove portion 34 formed in the front end of the column 30.

Accordingly, since the inner pad 50 moved by the driving of the motor 33 may be moved to the inner side surface of the disk 100 by the contact of the inclined surface 51a of the first protruding part 51 and the inclined surface 34a of the second groove portion 34, as shown in FIG. 4, the braking force may be generated by pressurizing the inner side surface of the disk 100 by the inner pad 50.

Meanwhile, the moving block 40 may be further moved along a previous moving direction when a state of pressing down the brake pedal is maintained, that is, when the driving of the motor 33 is continued, after the inner pad 50 pressurizes the inner side surface of the disk 100. In this case, the inner pad 50 may not be moved even when the moving block 40 is moved more along the previous moving direction since the inner pad 50 is already in contact with the inner side surface of the disk 100, and the column 30 may be moved in the direction opposite the disk 100 since the reaction force is operated.

When the column 30 is moved in the direction opposite the disk 100, the rear end of the column 30 may push the inner surface of the rear end of the caliper 20, the inner surface of the front end of the caliper 20 may also push the outer pad 60 arranged in the front end of the carrier 10 in the process of moving in the direction opposite the disk 100, and thus the outer pad 60 may be moved to the outer side surface of the disk 100. Accordingly, as shown in FIG. 5, the outer side surface of the disk 100 may be pressurized by the outer pad 60, and thus an additional braking force may be generated.

Further, after the inner pad 50 pressurizes the inner side surface of the disk 100, since a state of pressing down the brake pedal may be maintained, that is, the driving of the motor 33 may be continued, when the moving block 40 is further moved along with the previous moving direction, the contact member 35 may be coupled to the moving block 40 by the first arm 36, and the contact member 35 may be moved.

The moving member 11 may be arranged in the inner side of the contact member 35, and the moving member 11 may be coupled to the upper pad 70 by the connection bar 72. Accordingly, as shown in FIG. 7, as the contact member 35 is moved, the moving member 11 may be moved, and the upper pad 70 may be moved by the movement of the moving member 11.

In this case, the upper pad 70 may include the second protruding part 71 in which the inclined surface 71a is formed, and the inclined surface 71a of the second protruding part 71 may be in contact with the inclined surface 21a of the first groove portion 21 formed in the upper surface of the inner side of the caliper 20.

Accordingly, since the upper pad 70 moving in the first groove portion 21 is moved to the cylindrical surface of the upper end of the disk 100 by the contact of the inclined surface 71a of the second protruding part 71 and the inclined surface 21a of the first groove portion 21, as shown in FIG. 6, the cylindrical surface of the upper end of the disk 100 may be pressurized by the upper pad 70, and thus the additional braking force may be generated.

The electro-mechanical brake A for increasing the braking force according to an embodiment of the present invention may include the upper pad 70 together with the inner pad 50 and the outer pad 60, and the inner pad 50 may pressurize the inner side surface of the disk 100 by the movement of the moving block 40 by the rotation of the screw 32.

Further, the outer pad 60 may pressurize the outer side surface of the disk 100, and also the upper pad 70 may pressurize the cylindrical surface of the upper end of the disk 100, the braking force may be increased since the additional braking force can be further generated by pressurizing the cylindrical surface of the upper end of the disk compared with a case of pressurizing only the inner side surface and the outer side surface of the disk 100.

The electro-mechanical brake for increasing the braking force according to an embodiment of the present invention may include the upper pad together with the inner pad and the outer pad, the inner pad may pressurize the inner side surface of the disk by the movement of the moving block by the rotation of the screw, the outer pad may pressurize the outer side surface of the disk, the upper pad may also pressurize the cylindrical surface of the upper end of the disk, and thus the braking force may be increased since the additional braking force can be further generated by pressurizing the cylindrical surface of the upper end of the disk compared with a case of pressurizing the inner side surface and the outer side surface of the disk.

The above description is merely exemplary embodiments of the scope of the present invention, and it will be apparent to those skilled in the art that various modifications can be made to the above-described exemplary embodiments of the present invention without departing from the spirit or the scope of the invention. Accordingly, exemplary embodiments of the present invention are not intended to limit the scope of the invention and to describe the invention, and the scope of the present invention is not limited by the exemplary embodiments. Thus, it is intended that the present invention covers all such modifications provided they come within the scope of the appended claims and their equivalents.

What is claimed is:

1. An electro-mechanical brake for increasing a braking force, comprising:
   a disk rotating together with a wheel of a vehicle, and including a first side surface (inner side surface), a second side surface (outer side surface), and a circumference surface;
   a carrier coupled to a vehicle frame, and configured to accommodate an upper end portion of the disk, and including a pair of parallel side plates, each of said parallel side plates being provided with a sliding guide formed in the side plates;
   a column installed to be movable along with the sliding guide, and including a screw rotating according to a driving of a motor inside;
   a caliper coupled with the carrier, and configured to move by a contact with the column;
   a moving block to be screwed by the screw, and moving in front and rear directions on the screw according to a rotation of the screw;
   an inner pad configured to pressurize the inner side surface of the disk by moving to the inner side surface of the disk by the movement of the moving block;

an outer pad configured to pressurize the outer side surface of the disk by moving to the outer side surface of the disk by the movement of the moving block; and an upper pad configured to pressurize the circumference surface of the disk by moving to the upper end of the disk by the movement of the moving block.

2. The electro-mechanical brake of claim 1, wherein the carrier comprises a moving member which is movable in a horizontal direction on a bottom surface of a rear end.

3. The electro-mechanical brake of claim 2, wherein the moving member is arranged in a rail formed in the bottom surface of the rear end of the carrier.

4. The electro-mechanical brake of claim 1, wherein the caliper comprises a first groove portion in which inclined surfaces are formed on both sides on an upper surface of an inner side adjacent to the upper pad.

5. The electro-mechanical brake of claim 1, wherein the column comprises a second groove portion in which inclined surfaces are formed on both sides on a front end adjacent to the inner pad.

6. The electro-mechanical brake of claim 1, wherein the column comprises a contact member moving by the movement of the moving block in a rear end.

7. The electro-mechanical brake of claim 6, wherein the contact member comprises a first arm extending to the moving block.

8. The electro-mechanical brake of claim 6, wherein the contact member includes both inner side surfaces formed to be apart from both side surfaces of the moving member included in the carrier, respectively, and both outer side surfaces formed to be apart from both inner side surfaces of the column, respectively.

9. The electro-mechanical brake of claim 1, wherein the inner pad is arranged in front of the column in a state to be apart from the inner side surface of the disk.

10. The electro-mechanical brake of claim 1, wherein the inner pad comprises a first protruding part, on which an inclined surface to contact with an inclined portion of a second groove portion formed in the column, is formed on a rear end.

11. The electro-mechanical brake of claim 1, wherein the inner pad comprises a second arm extending to the moving block.

12. The electro-mechanical brake of claim 11, wherein the second arm is formed in multi-stage.

13. The electro-mechanical brake of claim 1, wherein the outer pad is arranged in a front end of the carrier in a state to be apart from the outer side surface of the disk.

14. The electro-mechanical brake of claim 1, wherein the upper pad is arranged in a state to be apart from the cylindrical surface of the upper end of the disk.

15. The electro-mechanical brake of claim 1, wherein the upper pad comprises a second protruding part, on which an inclined surface to contact with an inclined surface of a first groove portion formed in the caliper, is formed on an upper end.

16. The electro-mechanical brake of claim 15, wherein the second protruding part is coupled to the moving member included in the carrier through a connection bar.

* * * * *